United States Patent
Kuroiwa et al.

(10) Patent No.: US 10,484,169 B1
(45) Date of Patent: Nov. 19, 2019

(54) CIPHER BLOCK CHAINING DATA OBFUSCATION

(71) Applicant: Google Inc., Mountain View, CA (US)

(72) Inventors: Rintaro Kuroiwa, Seattle, WA (US); Thomas Inskip, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 189 days.

(21) Appl. No.: 15/612,752

(22) Filed: Jun. 2, 2017

(51) Int. Cl.
*H04L 29/06* (2006.01)
*H04L 9/06* (2006.01)
*H04L 9/00* (2006.01)

(52) U.S. Cl.
CPC .......... *H04L 9/0637* (2013.01); *H04L 9/002* (2013.01); *H04L 63/0428* (2013.01); *H04L 2209/20* (2013.01)

(58) Field of Classification Search
CPC ............ H04L 67/1078; H04L 63/0435; H04L 63/0442; H04L 63/06; H04L 63/061; H04L 67/104; H04W 12/04
See application file for complete search history.

(56) References Cited

U.S. PATENT DOCUMENTS

| | | |
|---|---|---|
| 5,615,264 A | 3/1997 | Kazmierczak et al. |
| 6,636,966 B1 | 10/2003 | Lee et al. |
| 9,331,848 B1* | 5/2016 | Pedersen ................. H04L 9/003 |
| 2006/0056623 A1* | 3/2006 | Gligor .................... H04L 9/0637 380/28 |
| 2006/0159260 A1* | 7/2006 | Pereira .................. H04W 12/04 380/44 |
| 2007/0016794 A1* | 1/2007 | Harrison ............... H04L 9/0656 713/182 |
| 2007/0198858 A1 | 8/2007 | Kim et al. |
| 2010/0299538 A1* | 11/2010 | Miller ................. G06F 12/1408 713/190 |
| 2018/0176192 A1* | 6/2018 | Davis .................... H04L 9/3247 |

* cited by examiner

*Primary Examiner* — Mohammad A Siddiqi
(74) *Attorney, Agent, or Firm* — Brake Hughes Bellermann LLP

(57) ABSTRACT

Techniques of decrypting encrypted content involve performing, during each cycle of a CBC mode of decrypting blocks of ciphertext included in the streaming media, an obfuscation operation prior to generating a plaintext block from the ciphertext block of that cycle. For example, when a ciphertext block from a current CBC cycle is input into a decryption key function, the user device performs an XOR operation on the output of the decryption key function and an obfuscation pad to produce an obfuscated decryption key function output. The user device then performs a XOR operation on the obfuscated decryption key function output and a ciphertext block from a previous CBC cycle to produce an obfuscated plaintext block that cannot be read by a user device. The user device may recover the actual plaintext block by performing a XOR operation on the plaintext block and the obfuscation pad.

20 Claims, 6 Drawing Sheets

CIPHER BLOCK CHAINING DATA OBFUSCATION

TECHNICAL FIELD

This description relates to decryption of encrypted content.

BACKGROUND

In some applications, one may receive a stream of encrypted data to be decrypted prior to usage. For example, suppose that an online movie service sends a stream of data representing a video over the Internet to a customer. Because of digital rights management (DRM) requirements as well as compression needs, the stream of data is encrypted. The encryption can be performed in a cipher block chaining (CBC) mode encryption. When received at the customer's device, a codec running on the customer's device then decrypts the data in the stream using a CBC mode decryption. In a conventional approach to such a decryption of streaming media, a codec running on a device may cause the device to store decrypted, plaintext data in memory prior to viewing.

SUMMARY

In one general aspect, a method can include receiving, by processing circuitry of a user device, a stream of data including the plurality of blocks of ciphertext data, each of the plurality of blocks of ciphertext data having been generated using a CBC mode encryption operation on a respective block of original plaintext data of a plurality of blocks of plaintext data, each of the plurality of blocks of plaintext data being readable by the user device. The method can also include generating, by the processing circuitry, a set of obfuscation pads. The method can further include, prior to completing the CBC mode decryption operation on the block of ciphertext data, performing, by the processing circuitry, an obfuscation operation on an obfuscation pad of the set of obfuscation pads during the CBC mode decryption operation to produce, as an output of the CBC mode decryption operation on the block of ciphertext data, a block of obfuscated plaintext data of a plurality of blocks of obfuscated data, the plurality of blocks of obfuscated plaintext data being rendered meaningless to the user device. The method can further include storing, by the processing circuitry, the block of obfuscated plaintext data in a storage device accessible to the user device.

The details of one or more implementations are set forth in the accompanying drawings and the description below. Other features will be apparent from the description and drawings, and from the claims.

DETAILED DESCRIPTION

In the conventional approach to decrypting content using a cipher block chaining (CBC) mode of decryption at a device, the device can store plaintext data resulting from decryption in a device memory. In such a situation, the plaintext data may become available to, for example, another device that can access the memory. The accessing of the plaintext data may be in violation of digital rights management (DRM) requirements. For example, DRM violations may potentially arise from the purchase of a digital copy of an album or movie that may easily be shared.

In accordance with the implementations described herein, improved techniques of decrypting content involve performing, during each cycle of a CBC mode of decrypting blocks of ciphertext included in the content, an obfuscation operation prior to generating a plaintext block from the ciphertext block of that cycle. In some implementations, obfuscation can include, for example, scrambling plaintext so as to render the plaintext undecipherable by the user device. For example, when a ciphertext block from a current CBC cycle is input into a decryption key (e.g., a string of characters representing or functioning as a key) function, e.g., an AES (Advanced Encryption Standard) key function, the user device performs an obfuscation operation, e.g., a logic operation such as an XOR operation, on the output of the decryption key function and an obfuscation pad (i.e., randomly generated string) to produce an obfuscated decryption key function output. The user device then performs a logic operation (e.g., XOR operation) on the obfuscated decryption key function output and a ciphertext block from a previous CBC cycle to produce an obfuscated plaintext block that cannot be read by a user device. The user device may recover the actual plaintext block by performing a deobfuscation operation, e.g., a logic operation such as an XOR operation on the plaintext block and the obfuscation pad. Although discussed in terms of XOR operation herein, other types of logical operations could be implemented.

Advantageously, the obfuscation operation helps, rather than hinders, DRM by producing an obfuscated block of data. Such an obfuscated block of data is stored in memory rather than the plaintext block so that the data may not be read by unauthorized users (e.g., another unauthorized device). A plaintext data block may be recovered on demand from the obfuscated data using a de-obfuscation operation only available to, for example, an authorized user, preventing sharing with unauthorized users. Thus, the improved techniques disclosed herein are directed to a solution that arises out of DRM.

Figure 1:
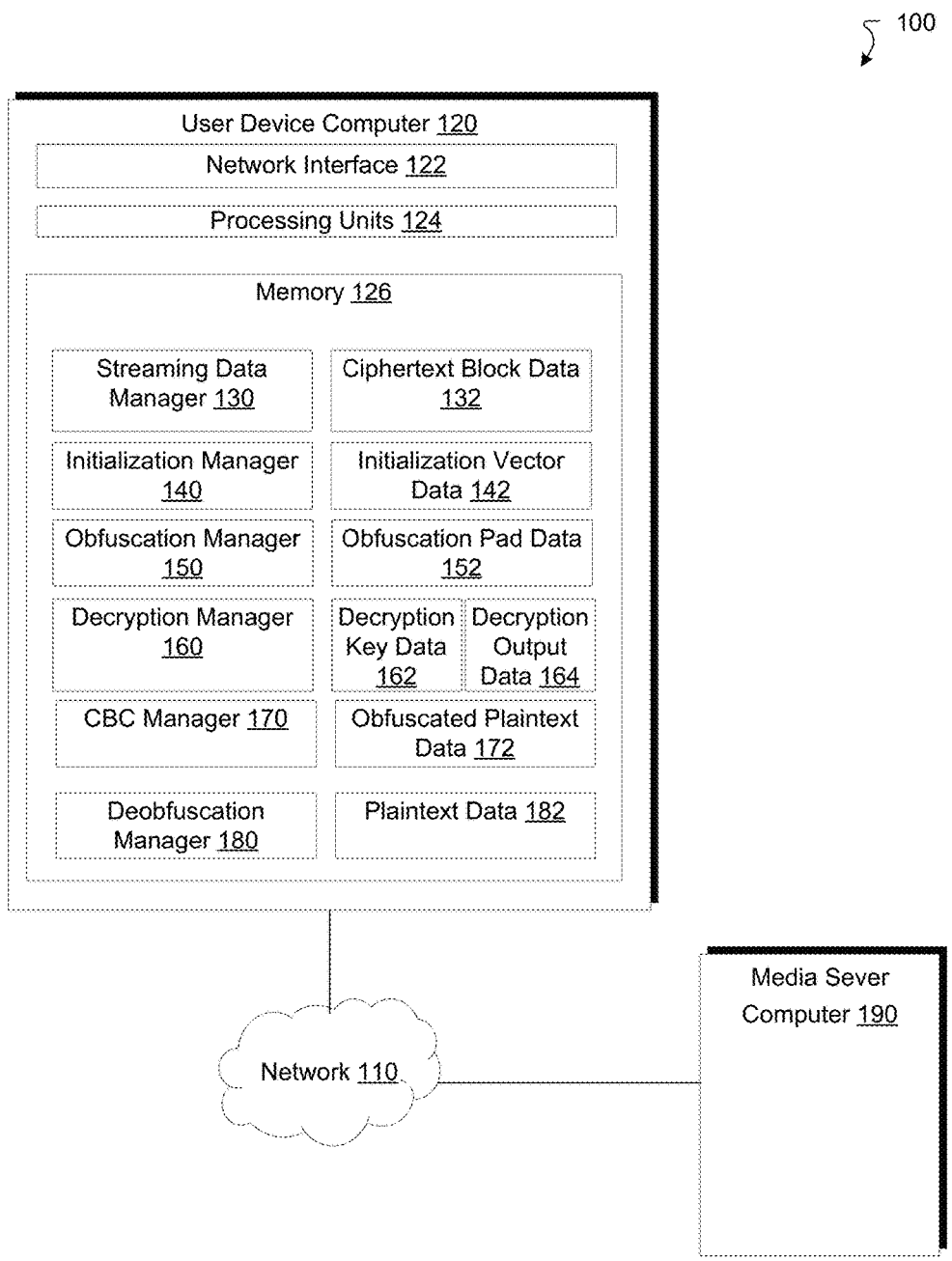
FIG. 1 is a diagram that illustrates an example electronic environment in which improved techniques described herein may be implemented.

FIG. 1 is a diagram that illustrates an example electronic environment 100 in which the above-described improved techniques may be implemented. As shown, in FIG. 1, the electronic environment 100 includes a network 110, a user device computer 120, and a media server computer 190.

The network 110 is configured and arranged to provide network connections between the user device computer 120 and the media server computer 190. The network 110 may implement any of a variety of protocols and topologies that are in common use for communication over the Internet or other networks. Further, the network 110 may include various components (e.g., cables, switches/routers, gateways/bridges, etc.) that are used in such communications.

The user device computer 120 is configured to receive content in the form of streaming data, e.g., streaming media, decrypt and obfuscate ciphertext from the streaming data to produce obfuscated plaintext, and deobfuscate the obfuscated plaintext. The user device computer 120 includes a network interface 122, one or more processing units 124, and memory 126. The network interface 122 includes, for example, Ethernet adaptors, Token Ring adaptors, and the like, for converting electronic and/or optical signals received from a network to electronic form for use by the user device computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the user device computer 120 can be, or can include processors (e.g., processing units 124) configured to process instructions stored in the memory 126. Examples of such instructions as depicted in FIG. 1 include a streaming data manager 130, an initialization manager 140, an obfuscation manager 150, a decryption manager 160, a CBC manager 170, and a deobfuscation manager 180. Further, as illustrated in FIG. 1, the memory 126 is configured to store various data, which is described with respect to the respective managers that use such data.

The streaming data manager 130 is configured to receive streaming data over the network 110 via the network interface 122. The streaming data manager 130 is also configured to break the streaming data into blocks of ciphertext data 132. The ciphertext data blocks 132 are fixed-sized blocks of plaintext data that has been encrypted using a CBC encryption process. In this way, each individual block of ciphertext data 132 may be decrypted in principle using only either an adjacent block of ciphertext data 132 or pre-determined initialization data.

The initialization manager 140 is configured to produce an initialization vector 142 for use in the CBC decryption process that will ultimately produce plaintext data blocks. The initialization vector 142 may be XORed (or may be combined using another logical operation) with the output of the decryption key function to produce a first plaintext block in the first CBC decryption cycle. In subsequent CBC cycles, the previous ciphertext block (i.e., the ciphertext block used in the previous CBC decryption cycle) is used in a similar manner. In some arrangements, the initialization vector 142 has the same length (e.g., in bytes) as a block of ciphertext data 132, although this by no means is a requirement. In some implementations, the initialization vector 142 can be the same initialization vector used in the CBC encryption process.

The obfuscation manager 150 is configured to generate an obfuscation pad 152 for obfuscating plaintext data resulting from a CBC decryption process before the plaintext data can be output to the memory 126. In some implementations, the obfuscation manager is configured to generate the obfuscation pad 152 using a random number generator. In some implementations, the obfuscation pad 152 can have the same length (e.g., in bytes) as a block of ciphertext data 132.

The decryption manager 160 is configured to apply a cryptographic function to the ciphertext block data 132 and a decryption key 162 to produce decryption output data 164. In some implementations, the cryptographic function is an AES function of the decryption key 162 and a block of ciphertext data 132, where the decryption key 162 has 64 bits, 128 bits, 192 bits, 256 bits, or more.

The CBC manager 170 is configured to generate obfuscated plaintext data 172 using the obfuscation pad data 152, the decryption output data 164, the ciphertext block data 132, and the initialization vector 142. In some implementations, the CBC manager 170 is configured to apply an obfuscation operation to the decryption output data 164, e.g., an XOR operation on the decryption output data 164 and the obfuscation pad data 152 to produce an obfuscated decryption output. In that implementation, the CBC manager 170 is configured to perform a XOR operation on the obfuscated decryption output and a previous ciphertext block 132 or the initialization vector 142 to produce the obfuscated plaintext data 172. In some implementations, the CBC manager 170 is configured to apply an obfuscation operation to the previous ciphertext block 132 or the initialization vector 142 to produce an obfuscated ciphertext block. In that implementation, the CBC manager 170 is configured to perform a XOR operation on the obfuscated ciphertext block and the decryption output data 164 the obfuscated plaintext data 172.

The deobfuscation manager 180 is configured to produce a plaintext data block 182 by performing a deobfuscation operation, e.g., a XOR operation, on a obfuscated plaintext data block 172 and the obfuscation pad 152.

The media server computer 190 is configured to provide streaming media to the user device computer 120 over the network 110. The media server computer 190 is further configured to perform a CBC encryption process on media to be delivered to the user device computer 120 prior to streaming over the network 110. As stated above, in some implementations, the initialization vector used in performing the CBC encryption process is the same as the initialization vector 142 used in the CBC decryption process.

The components (e.g., modules, processing units 124) of the user device computer 120 can be configured to operate based on one or more platforms (e.g., one or more similar or different platforms) that can include one or more types of hardware, software, firmware, operating systems, runtime libraries, and/or so forth. In some implementations, the components of the user device computer 120 can be configured to operate within a cluster of devices (e.g., a server farm). In such an implementation, the functionality and processing of the components of the user device computer 120 can be distributed to several devices of the cluster of devices.

The components of the user device computer 120 can be, or can include, any type of hardware and/or software configured to process attributes. In some implementations, one or more portions of the components shown in the components of the user device computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the user device computer 120 can be, or can include, a software module configured for execution by at least one processor (not shown). In some implementations, the functionality of the components can be included in different modules and/or different components than those shown in FIG. 1.

Although not shown, in some implementations, the components of the user device 120 (or portions thereof) can be configured to operate within, for example, a data center (e.g., a cloud computing environment), a computer system, one or more server/host devices, and/or so forth. In some implementations, the components of the user device computer 120 (or portions thereof) can be configured to operate within a network. Thus, the components of the user device computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the user device computer 120 can be, or can include, processors configured to process instructions stored in a memory. For example, a streaming data manager 130 (and/or a portion thereof), an initialization manager 140 (and/or a portion thereof), an obfuscation manager 150 (and/or a portion thereof), a decryption manager 160 (and/or a portion thereof), a CBC manager 170 (and/or a portion thereof), and a deobfuscation manager 180 (and/or a portion thereof) can be a combination of a processor and a memory configured to execute instructions related to a process to implement one or more functions.

Figure 2:
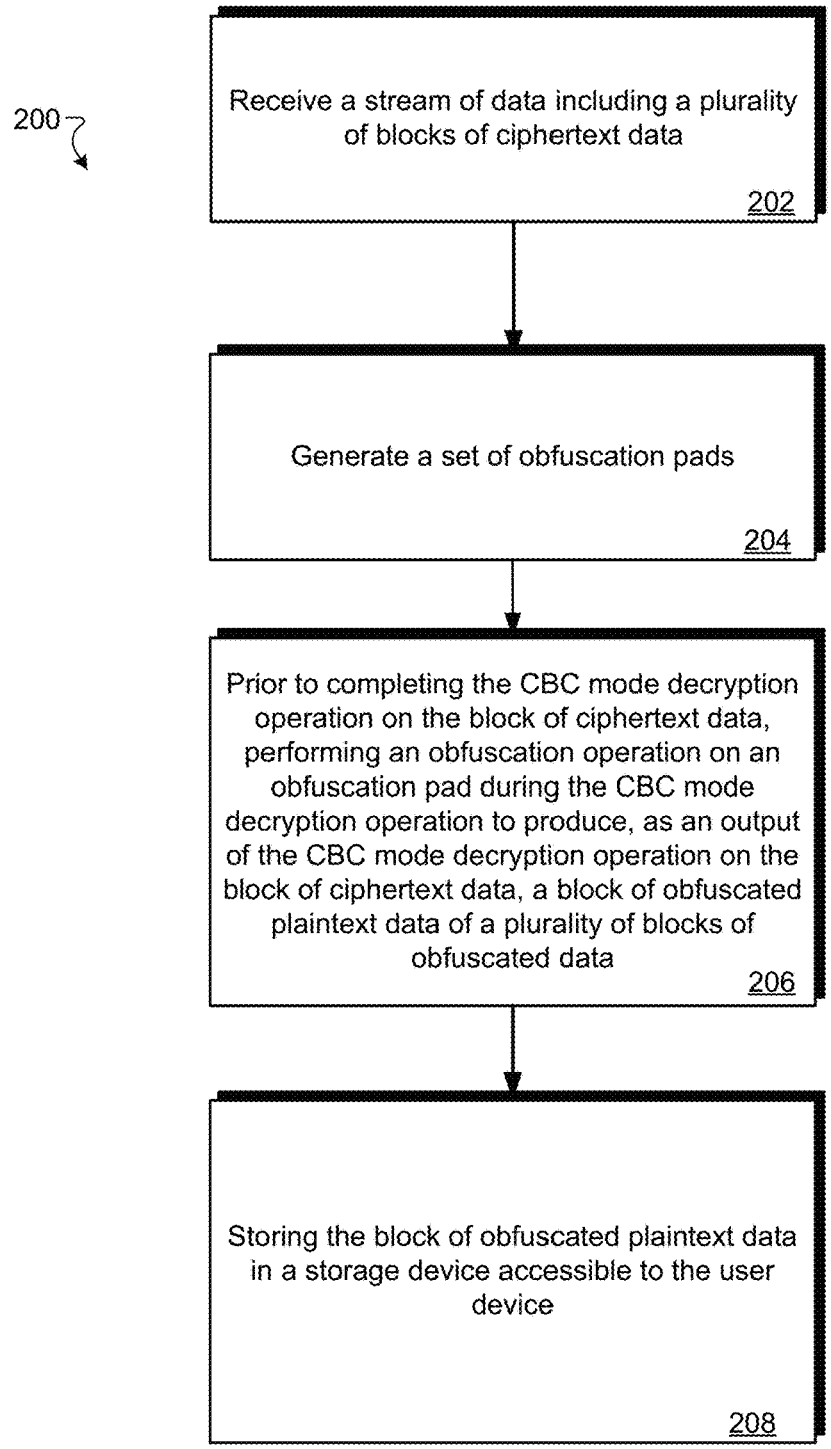
FIG. 2 is a flow chart that illustrates an example method of implementing the improved techniques as shown in FIG. 1.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the user device computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the user device computer 120. As illustrated in FIG. 2, the memory 126 is configured to store various data, including ciphertext block data 132, initialization vector data 142, obfuscation pad data 152, decryption key data 162, decryption output data 164, obfuscated plaintext data 172, and plaintext data 182.

FIG. 2 is a flow chart depicting an example method 200 of decrypting streaming media. The method 200 may be performed by software constructs described in connection with FIG. 1, which reside in memory 126 of the user device computer 120 and are run by the set of processing units 124.

At 202, the user device computer 120 receives a stream of data including a plurality of blocks of ciphertext data. Each of the plurality of blocks of ciphertext data has been generated on the media server computer 190 using a CBC mode encryption operation on a respective block of original plaintext data of a plurality of blocks of plaintext data. Each of the plurality of blocks of plaintext data is readable by the user device computer 120. For example, suppose that the streaming media sent by the media server computer 190 represents video content requested by a subscriber to a video content service. Prior to sending the video content to the subscriber's user device computer 120, the media server computer 190 performs a CBC encryption process in the video content, producing the plurality of blocks of ciphertext data in the streaming media.

In some implementations, the stream of data is delivered to the user device computer 120 through a content delivery network (CDN) separately from the media server computer 190 that encrypts the stream of data.

At 204, the user device computer 120 generates a set of obfuscation pads. The user device computer 120 uses each of the set of obfuscation pads during a respective CBC decryption process cycle. In some implementations, there is a single obfuscation pad for the CBC decryption cycles, each of which produces a respective obfuscated block of plaintext data. In some implementations, the user device computer 120 generates the set of obfuscation pads using a random number generator. In the case that there is more than one distinct obfuscation pad, a first obfuscation pad may be used as input into the random number generator to produce a second obfuscation pad.

At 206, the user device computer 120 performs an obfuscation operation on an obfuscation pad of the set of obfuscation pads during the CBC mode decryption operation prior to completing the CBC mode decryption operation on the block of ciphertext data. In performing the obfuscation operation on the obfuscation pad, the user device computer 120 produces, as an output of the CBC mode decryption operation on the block of ciphertext data, a block of obfuscated plaintext data of a plurality of blocks of obfuscated data. The plurality of blocks of obfuscated plaintext data so produced are unreadable by the user device.

At 208, the user device computer 120 stores the block of obfuscated plaintext data in a storage device accessible to the user device. In this way, the obfuscated plaintext data remains inaccessible to someone who is not authorized to access the plaintext data, e.g., someone who is not a subscriber of the video content service that sent the streaming media to the user device computer 120.

Figure 3:
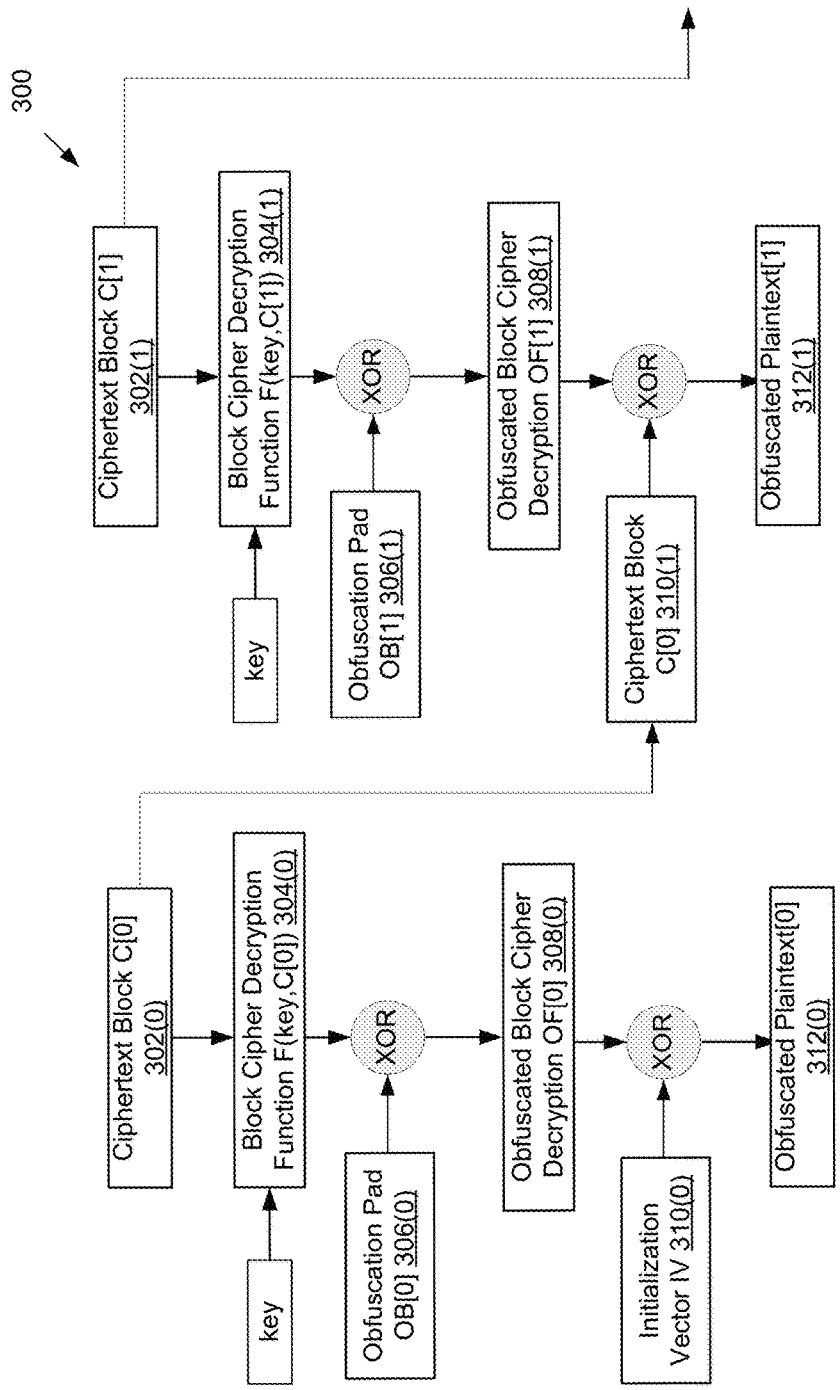
FIG. 3 is a diagram that illustrates an example process of generating obfuscated plaintext within a CBC mode decryption operation according to the improved techniques shown in FIG. 1.

FIG. 3 is a diagram depicting an example CBC decryption process 300 according to the improved techniques disclosed herein. In FIG. 3, there are two cycles of the CBC decryption process 300 shown for simplicity purposes. Usually there are more than two cycles, i.e., two ciphertext blocks in streaming media.

For the CBC decryption process 300 shown in FIG. 3, the user device computer 120 (FIG. 1) has produced ciphertext blocks C[0] 302(0) and C[1] 302(1) as input into the CBC decryption process 300. For example, each of the ciphertext blocks 302(0) and 302(1) may be 16 bytes, 32 bytes, 64 bytes, or larger (or smaller) according to the CBC encryption process used in the media server computer 190.

The CBC manager 170 inputs the ciphertext block 302(0) into a block cipher decryption function 304(0) along with a cryptographic key. For example, the block cipher decryption function 304(0) (as well as the block cipher decryption function 304(1)) may be an AES cryptographic function or some variant. In this case, the key may be 128 bits, 256 bits, or greater (or lesser). In some implementations, the size (e.g., length in bits or bytes) of the key can vary with the size of the ciphertext block 302(0), e.g., the key may be longer with a longer ciphertext block. The output of the block cipher decryption function 304(0) is a value equal to F(key, C[0]) which may have as many bits as the key and/or the ciphertext blocks C[0] 302(0).

The CBC manager 170 then performs a XOR operation on the obfuscation pad OB[0] and the output F(key,C[0]) to produce an obfuscated block cipher decryption output OF[0] 308(0). Mathematically, when the decryption function is an AES function, this XOR operation may be expressed as follows:

$$OAES_0 = OB_0 \oplus AES_0,$$

where $AES_0$ is the output F(key, C[0]) and $OAES_0$ is the obfuscated block cipher decryption output OF[0].

The CBC manager 170 performs a XOR operation on the obfuscated block cipher decryption output OF[0] and the initialization vector IV to produce the obfuscated plaintext block OP[0]. Mathematically, when the decryption function is an AES function, this XOR operation may be expressed as follows:

$$OP_0 = OAES_0 \oplus IV,$$

where $OP_0$ is the obfuscated plaintext block OP[0].

The CBC manager may produce other obfuscated plaintext blocks in parallel. For example, as illustrated in FIG. 3, when the CBC manager 170 inputs the ciphertext block C[1] into the next CBC decryption cycle, similar operations as the previous cycle produce an obfuscated block cipher decryption output OF[1] 308(1). Mathematically, when the decryption function is an AES function, this XOR operation may be expressed as follows:

$$OAES_1 = OB_1 \oplus AES_1,$$

where $AES_1$ is the output F(key, C[1]) and $OAES_1$ is the obfuscated block cipher decryption output OF[1]. Further, the CBC manager 170 then performs a XOR operation on the obfuscated block cipher decryption output and the pervious ciphertext block C[0}. Mathematically, when the decryption function is an AES function, this XOR operation may be expressed as follows:

$$OP_1 = OAES_1 \oplus C_0.$$

In general, the kth block of obfuscated plaintext generated at the kth cycle is found as follows when the decryption function is an AES function:

$$OAES_k = OB_k \oplus AES_k,$$

$$OP_k = OAES_k \oplus C_{k-1}.$$

Figure 4:
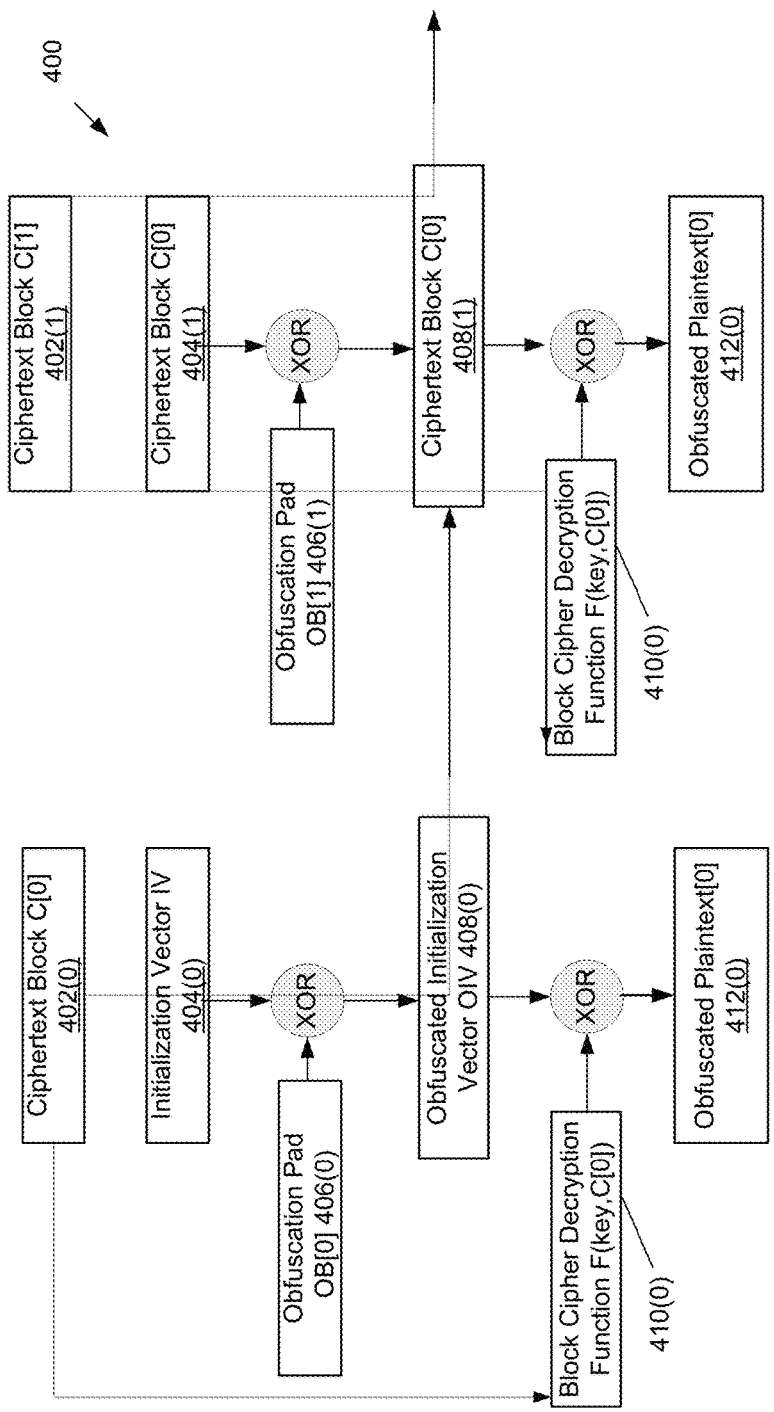
FIG. 4 is a diagram that illustrates another example process of generating obfuscated plaintext within a CBC mode decryption operation according to the improved techniques shown in FIG. 1.

FIG. 4 illustrates a diagram depicting another example CBC decryption process 400 according to the improved techniques disclosed herein. In FIG. 4, there are two cycles of the CBC decryption process 400 shown for simplicity purposes. Usually there are more than two cycles, e.g., more than two ciphertext blocks in streaming media.

The CBC manager 170 can begin by performing an XOR operation on the initialization vector IV 404(0) and an obfuscation pad OB[0] 406(0) to produce an obfuscated initialization vector OIV 408(0). Mathematically, when the decryption function is an AES function, this XOR operation may be expressed as follows:

$$OIV = OB_0 \oplus IV.$$

The CBC manager 170 then inputs the first ciphertext block C[0] 402(0) and a cryptographic key into the block cipher decryption function 410(0) to produce the output F(key,C[0]) 410(0). The CBC manager 170 performs a XOR operation on this output and the obfuscated initialization vector OIV 408(0) to produce the obfuscated plaintext OP[0] 412(0). Mathematically, when the decryption function is an AES function, this XOR operation may be expressed as follows:

$$OP_0 = AES_0 \oplus OIV.$$

The CBC manager may produce other obfuscated plaintext blocks in parallel. For example, as illustrated in FIG. 4, when the CBC manager 170 inputs the ciphertext block C[1] into the next CBC decryption cycle, similar operations as the previous cycle produce an obfuscated ciphertext block OC[0] 408(1). Mathematically, when the decryption function is an AES function, this XOR operation may be expressed as follows:

$$OC_0 = OB_1 \oplus C_0.$$

The CBC manager 170 then inputs the next ciphertext block C[1] 402(1) and a cryptographic key into the block cipher decryption function 410(1) to produce the output F(key,C[1]) 410(1). The CBC manager 170 performs a XOR operation on this output and the obfuscated ciphertext block OC[0] 408(1) to produce the obfuscated plaintext OP[1] 412(1). Mathematically, when the decryption function is an AES function, this XOR operation may be expressed as follows:

$$OP_1 = AES_1 \oplus OC_0.$$

In general, the kth block of obfuscated plaintext generated at the kth cycle is found as follows when the decryption function is an AES function:

$$OC_{k-1} = OB_k \oplus C_{k-1},$$

$$OP_k = AES_k \oplus OC_{k-1}.$$

Figure 5:
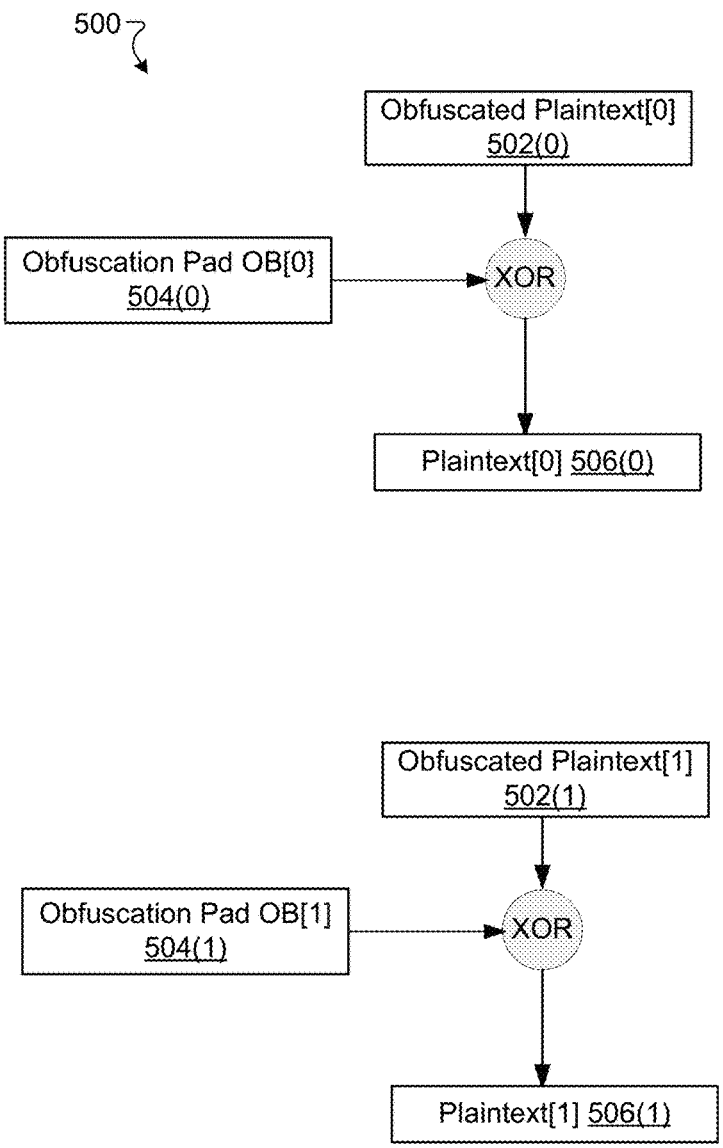
FIG. 5 is a diagram that illustrates an example process of generating plaintext according to the improved techniques shown in FIG. 1.

FIG. 5 illustrates a diagram depicting an example deobfuscation process according to the improved techniques disclosed herein. In FIG. 3, there are two blocks shown for simplicity purposes. In some implementations, there can be more than two plaintext blocks to be deobfuscated.

According to FIG. 5, the deobfuscation manager 180 (FIG. 1) obtains a plaintext block P[0] 506(0) by performing a XOR operation on the obfuscated plaintext block OP[0] 502(0) and the obfuscation pad OB[0], and similarly with subsequent obfuscated plaintext blocks, e.g., OP[1] 502(1) XORed with the obfuscation pad OB[1] 504(1) to produce the plaintext block P[1] 506(1), and so on.

The examples provided in the above description were mainly directed to applications involving DRM and streaming media. Nevertheless, the improved techniques disclosed here apply to any other technologies in which it is desired for data to be hidden from applications after decryption. Examples of such technologies include preventing silent data corruption in fault-tolerant RAID arrays and database management systems.

Figure 6:
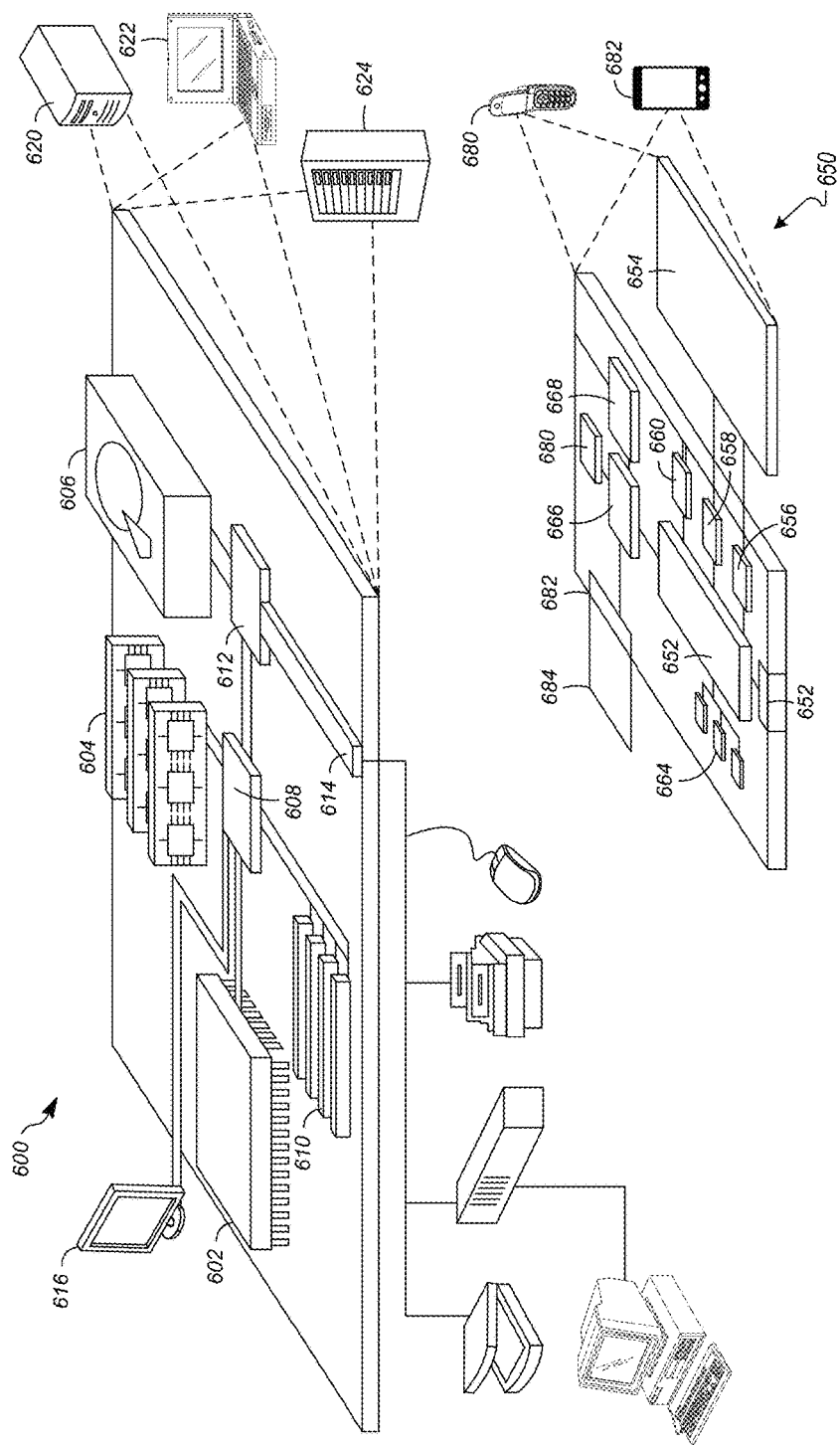
FIG. 6 illustrates an example of a computer device and a mobile computer device that can be used with circuits described here.

FIG. 6 illustrates an example of a generic computer device 600 and a generic mobile computer device 650, which may be used with the techniques described here.

As shown in FIG. 6, computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 500, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 506 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

FIG. 7 illustrates an example implementation of a head-mounted display as shown in FIGS. 3 and 5. In FIG. 7, a user wearing an HMD 700 is holding a portable handheld electronic device 702. The handheld electronic device 702 may be, for example, a smartphone, a controller, a joystick, or another portable handheld electronic device(s) that may be paired with, and communicate with, the HMD 700 for interaction in the immersive virtual environment generated by the HMD 700. The handheld electronic device 702 may be operably coupled with, or paired with the HMD 700 via, for example, a wired connection, or a wireless connection such as, for example, a WiFi or Bluetooth connection. This pairing, or operable coupling, of the handheld electronic device 702 and the HMD 700 may provide for communication between the handheld electronic device 702 and the HMD 700 and the exchange of data between the handheld electronic device 702 and the HMD 700. This may allow the handheld electronic device 602 to function as a controller in communication with the HMD 700 for interacting in the immersive virtual environment generated by the HMD 700. That is, a manipulation of the handheld electronic device 702, such as, for example, a beam or ray emitted by the handheld electronic device 702 and directed to a virtual object or feature for selection, and/or an input received on a touch surface of the handheld electronic device 702, and/or a movement of the handheld electronic device 702, may be translated into a corresponding selection, or movement, or other type of interaction, in the immersive virtual environment generated by the HMD 700. For example, the HMD 700, together with the handheld electronic device 702, may generate a virtual environment as described above, and the handheld electronic device 702 may be manipulated to effect a change in scale, or perspective, of the user relative to the virtual features in the virtual environment as described above.

FIGS. 8A and 8B are perspective views of an example HMD, such as, for example, the HMD 700 worn by the user in FIG. 7, and FIG. 8C illustrates an example handheld electronic device, such as, for example, the handheld electronic device 702 shown in FIG. 7.

The handheld electronic device 802 may include a housing 803 in which internal components of the device 802 are received, and a user interface 804 on an outside of the housing 803, accessible to the user. The user interface 804 may include a touch sensitive surface 806 configured to receive user touch inputs. The user interface 804 may also include other components for manipulation by the user such as, for example, actuation buttons, knobs, joysticks and the like. In some implementations, at least a portion of the user interface 804 may be configured as a touchscreen, with that portion of the user interface 804 being configured to display user interface items to the user, and also to receive touch inputs from the user on the touch sensitive surface 806. The handheld electronic device 802 may also include a light source 808 configured to selectively emit light, for example, a beam or ray, through a port in the housing 803, for example, in response to a user input received at the user interface 804.

The HMD 800 may include a housing 810 coupled to a frame 820, with an audio output device 830 including, for example, speakers mounted in headphones, also be coupled to the frame 820. In FIG. 8B, a front portion 810a of the housing 810 is rotated away from a base portion 810b of the housing 810 so that some of the components received in the housing 810 are visible. A display 840 may be mounted on an interior facing side of the front portion 810a of the housing 810. Lenses 850 may be mounted in the housing 810, between the user's eyes and the display 840 when the front portion 810a is in the closed position against the base portion 810b of the housing 810. In some implementations, the HMD 800 may include a sensing system 860 including various sensors and a control system 870 including a processor 890 and various control system devices to facilitate operation of the HMD 800.

In some implementations, the HMD 800 may include a camera 880 to capture still and moving images. The images captured by the camera 880 may be used to help track a physical position of the user and/or the handheld electronic device 802 in the real world, or physical environment relative to the virtual environment, and/or may be displayed to the user on the display 840 in a pass through mode, allowing the user to temporarily leave the virtual environment and return to the physical environment without removing the HMD 800 or otherwise changing the configuration of the HMD 800 to move the housing 810 out of the line of sight of the user.

In some implementations, the HMD 800 may include a gaze tracking device 865 to detect and track an eye gaze of the user. The gaze tracking device 865 may include, for example, an image sensor 865A, or multiple image sensors 865A, to capture images of the user's eyes, for example, a particular portion of the user's eyes, such as, for example, the pupil, to detect, and track direction and movement of, the user's gaze. In some implementations, the HMD 800 may be configured so that the detected gaze is processed as a user input to be translated into a corresponding interaction in the immersive virtual experience.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of performing a cipher block chaining (CBC) mode decryption operation on a plurality of blocks of ciphertext data, the method comprising:

receiving, by processing circuitry of a user device, a stream of data including the plurality of blocks of ciphertext data, each of the plurality of blocks of ciphertext data having been generated using a CBC mode encryption operation on a respective block of original plaintext data of a plurality of blocks of plaintext data, each of the plurality of blocks of plaintext data being readable by the user device;

generating, by the processing circuitry, a set of obfuscation pads;

prior to completing the CBC mode decryption operation on the block of ciphertext data, performing, by the processing circuitry, an obfuscation operation on an obfuscation pad of the set of obfuscation pads during the CBC mode decryption operation to produce, as an output of the CBC mode decryption operation on the block of ciphertext data, a block of obfuscated plaintext data of a plurality of blocks of obfuscated data, the plurality of blocks of obfuscated plaintext data being unreadable by the user device;

storing, by the processing circuitry, the block of obfuscated plaintext data in a storage device accessible to the user device; and obtaining a decryption key function that, when operating on the block of ciphertext data and a respective key, produces a keystring, and wherein the performing the obfuscation operation on the obfuscation pad during the CBC mode decryption operation includes performing a combination operation on the keystring and the obfuscation pad to produce an obfuscated keystring.

2. The method as in claim 1, further comprising:

after completing the CBC mode decryption operation on the block of ciphertext data, performing a deobfuscation operation on the obfuscation pad and the block of obfuscated plaintext data of the plurality of blocks of obfuscated data to produce the respective block of plaintext data of the plurality of blocks of plaintext data.

3. The method as in claim 2, wherein the performing the deobfuscation operation on the obfuscation pad and the block of obfuscated plaintext data includes performing an XOR operation on the block of obfuscated plaintext data with the obfuscation pad.

4. The method as in claim 1, wherein the generating the set of obfuscation pads includes:
obtaining output from a random number generator; and
forming an obfuscation pad of the set of obfuscation pads based on the output from the random number generator.

5. The method as in claim 1, further comprising:
in response to the keystring being produced, performing an XOR operation on the previous block of ciphertext data of the plurality of blocks of ciphertext data, using the keystring, to produce the respective block of plaintext data.

6. The method as in claim 1, wherein the obfuscation pad uses the same amount of memory as the ciphertext block.

7. The method as in claim 1, wherein each obfuscation pad of the set of obfuscation pads is equal to each other obfuscation pad of the set of obfuscation pads.

8. The method as in claim 1, wherein performing the combination operation includes performing an XOR operation on the keystring with the obfuscation pad.

9. The method as in claim 8, wherein the obfuscated keystring is configured to produce a block of obfuscated plaintext data in response to the performance of the XOR operation on the keystring with the obfuscation pad.

10. The method as in claim 1, wherein the keystring has a length equal to a length of the block of ciphertext data.

11. A computer program product comprising a nontransitory storage medium, the computer program product including code that, when executed by processing circuitry of a user device configured to perform a cipher block chaining (CBC) mode decryption operation on a plurality of blocks of ciphertext data, causes the processing circuitry to perform a method, the method comprising:
receiving a stream of data including the plurality of blocks of ciphertext data, each of the plurality of blocks of ciphertext data having been generated using a CBC mode encryption operation on a respective block of original plaintext data of a plurality of blocks of plaintext data, each of the plurality of blocks of plaintext data being readable by the user device;
generating a set of obfuscation pads;
prior to completing the CBC mode decryption operation on the block of ciphertext data, performing an obfuscation operation on an obfuscation pad of the set of obfuscation pads during the CBC mode decryption operation to produce, as an output of the CBC mode decryption operation on the block of ciphertext data, a block of obfuscated plaintext data of a plurality of blocks of obfuscated data, the plurality of blocks of obfuscated plaintext data being unreadable by the user device;
storing the block of obfuscated plaintext data in a storage device accessible to the user device; and
obtaining a decryption key function that, when operating on the block of ciphertext data and a respective key, produces a keystring, and
wherein the performing the obfuscation operation on the obfuscation pad during the CBC mode decryption operation includes performing a combination operation on a previous block of ciphertext data and the obfuscation pad to produce an obfuscated cipherblock.

12. The computer program product as in claim 11, further comprising:
after completing the CBC mode decryption operation on the block of ciphertext data, performing a deobfuscation operation on the obfuscation pad and the block of obfuscated plaintext data of the plurality of blocks of obfuscated data to produce the respective block of plaintext data of the plurality of blocks of plaintext data.

13. The computer program product as in claim 12, wherein the performing the deobfuscation operation on the obfuscation pad and the block of obfuscated plaintext data includes performing an XOR operation on the block of obfuscated plaintext data with the obfuscation pad.

14. The computer program product as in claim 11, wherein generating the set of obfuscation pads includes:
obtaining output from a random number generator; and
forming an obfuscation pad of the set of obfuscation pads based on the output from the random number generator.

15. The computer program product as in claim 11, wherein the method further comprises: in response to the keystring being produced, performing an XOR operation on a previous block of ciphertext data of the plurality of blocks of ciphertext data with the keystring to produce the respective block of plaintext data.

16. An electronic apparatus configured to perform a cipher block chaining (CBC) mode decryption operation on a plurality of blocks of ciphertext data, the electronic apparatus comprising:
a memory; and
controlling circuitry coupled to the memory, the controlling circuitry configured to:
receive a stream of data including the plurality of blocks of ciphertext data, each of the plurality of blocks of ciphertext data having been generated using a CBC mode encryption operation on a respective block of original plaintext data of a plurality of blocks of plaintext data, each of the plurality of blocks of plaintext data being readable by the user device;
generate a set of obfuscation pads;
prior to completing the CBC mode decryption operation on the block of ciphertext data, perform an obfuscation operation on an obfuscation pad of the set of obfuscation pads during the CBC mode decryption operation to produce, as an output of the CBC mode decryption operation on the block of ciphertext data, a block of obfuscated plaintext data of a plurality of blocks of obfuscated data, the plurality of blocks of obfuscated plaintext data being unreadable by the user device;
store the block of obfuscated plaintext data in a storage device accessible to the user device; and
obtain a decryption key function that, when operating on the block of ciphertext data and a respective key, produces a keystring, and
wherein the controlling circuitry configured to perform the obfuscation operation on the obfuscation pad during the CBC mode decryption operation is further configured to perform a combination operation on a previous block of ciphertext data and the obfuscation pad to produce an obfuscated cipherblock.

17. The electronic apparatus as in claim 16, wherein the controlling circuitry is further configured to:

after completing the CBC mode decryption operation on the block of ciphertext data, perform a deobfuscation operation on the obfuscation pad and the block of obfuscated plaintext data of the plurality of blocks of obfuscated data to produce the respective block of plaintext data of the plurality of blocks of plaintext data.

18. The electronic apparatus as in claim 17, wherein the controlling circuitry configured to perform the deobfuscation operation on the obfuscation pad and the block of obfuscated plaintext data is further configured to perform an XOR operation on the block of obfuscated plaintext data with the obfuscation pad.

19. The electronic apparatus as in claim 16, wherein the controlling circuitry configured to generate the set of obfuscation pads is further configured to:

obtain output from a random number generator; and form an obfuscation pad of the set of obfuscation pads based on the output from the random number generator.

20. The electronic apparatus as in claim 16, wherein the controlling circuitry is further configured to, in response to the keystring being produced, perform an XOR operation on a previous block of ciphertext data of the plurality of blocks of ciphertext data with the keystring to produce the respective block of plaintext data.

* * * * *